Patented Oct. 14, 1952

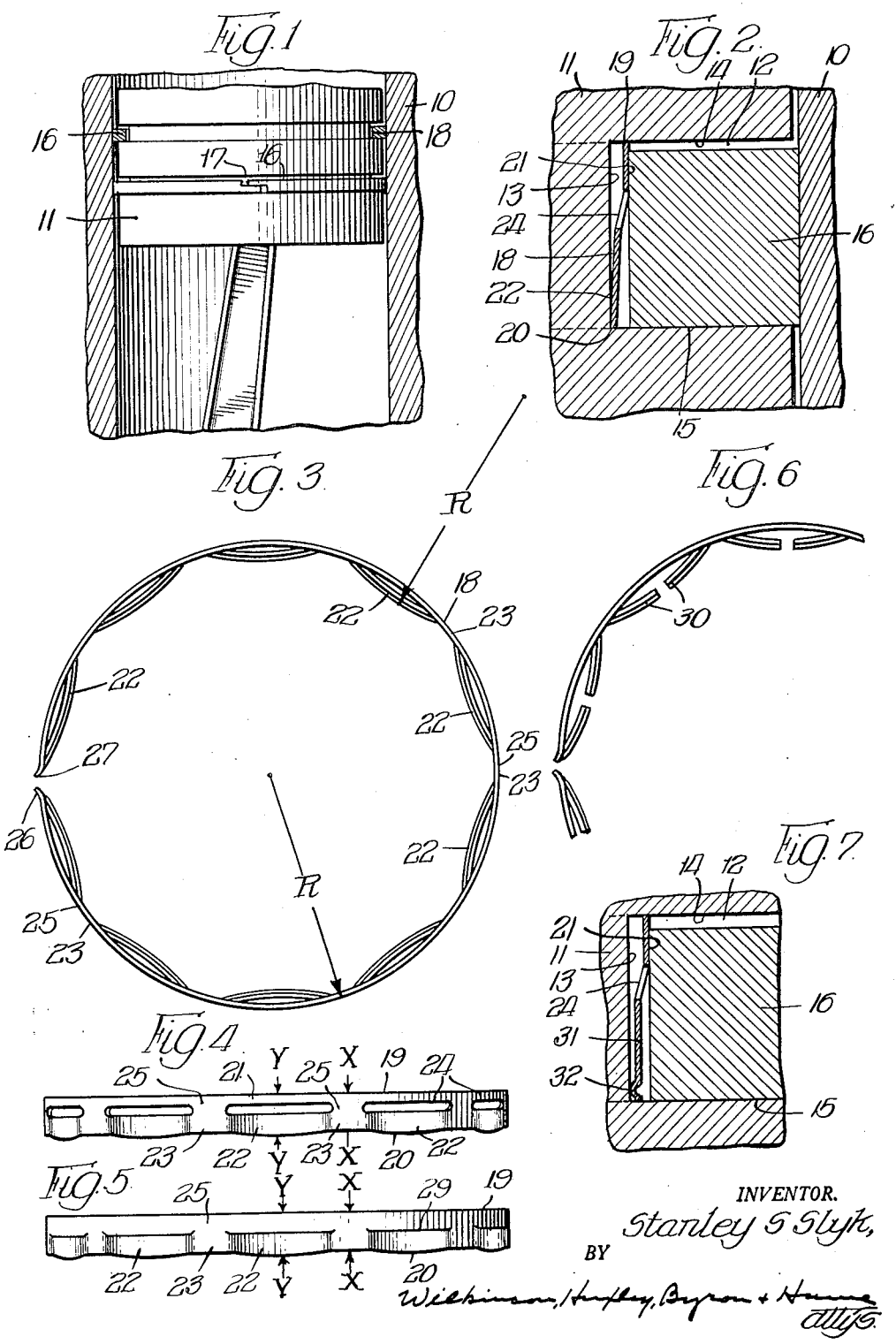

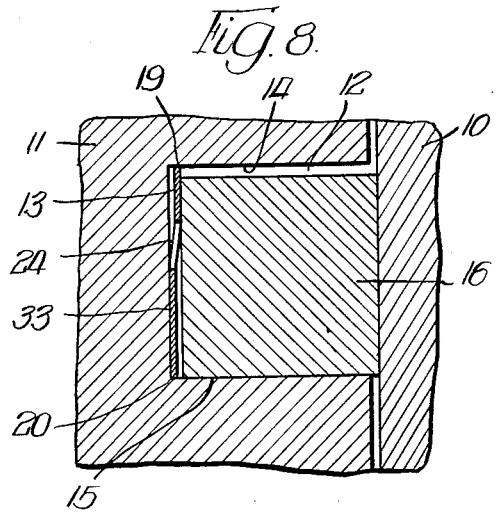
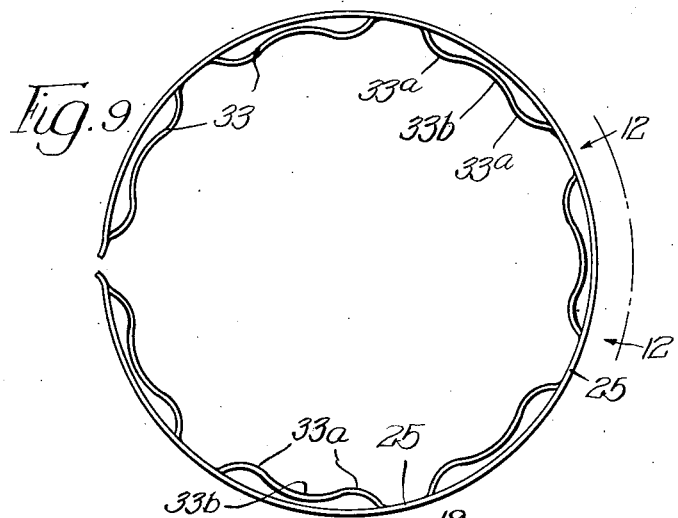
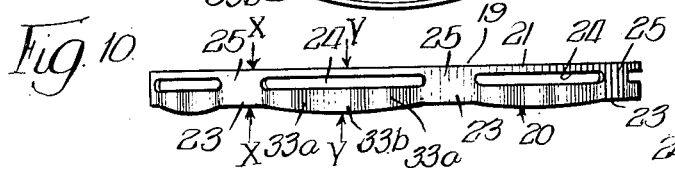
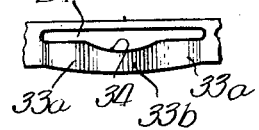
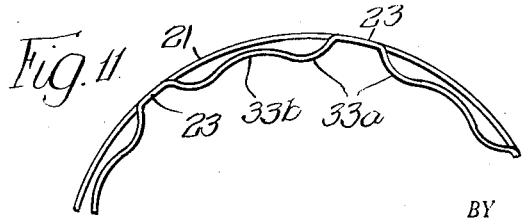

2,614,010

UNITED STATES PATENT OFFICE 2,614,010

COMBINED EXPANDER AND OIL CHECK FOR PISTON RINGS

Stanley S. Slyk, Chicago, Ill.

Application October 6, 1948, Serial No. 53,055

14 Claims. (Cl. 309—45)

The present invention relates to improvements in combined expander and oil check for piston rings.

More particularly, the present invention relates to means for minimizing the leakage of oil past the piston of an internal combustion motor and for minimizing the loss of compression in said motor. The piston of an internal combustion motor is ordinarily provided with piston rings, one or more of which are commonly designed to minimize the leakage of oil from the crank case into the cylinder.

This application is a continuation in part of application, Serial No. 648,413, filed February 18, 1946, by the present applicant.

An object of the present invention is to provide an improved oil check adapted to co-operate with a piston ring to minimize the leakage of oil past the said piston ring and to minimize loss of compression.

A further object is to provide improved means adapted to be located inwardly of a piston ring and having the triple function of minimizing the flow of oil past said piston ring, of biasing said piston ring outwardly against the cylinder wall and of minimizing loss of compression.

A further object is to provide an improved oil check adapted to be associated with a piston ring in the internal combustion motor which oil check is effective in operation, though simple and sturdy in construction.

A further object is to provide an improved oil check adapted to be used in combination with a piston ring which may be readily inserted into the piston ring groove and which in service is effective in checking the leakage of oil past the said piston ring.

A further object is to provide a resilient oil check adapted to be located readily within a piston ring groove but which, in service, will resiliently contact the walls of said groove which are disposed in right angular relationship with the axis of movement of the corresponding piston and will check the passage of oil and loss of compression past the ring in said groove.

A further object is to provide an improved oil check which is simple and sturdy in construction, is easy to install, and well adapted to meet the needs of ordinary service.

Further objects will appear as the description proceeds.

Referring to the drawings—

Figure 1 is a view in sectional elevation showing a piston located within a cylinder wall, which piston may be provided with an embodiment of the present invention;

Figure 2 is a view on an enlarged scale of a portion of the structure shown in Figure 1 illustrating one embodiment of the present invention located therein;

Figure 3 is a top plan view of the embodiment of the present invention shown in Figure 2;

Figure 4 is a view in side elevation of the structure illustrated in Figure 3;

Figure 5 is a view similar to Figure 4, but illustrating a structure having a narrower opening for the passage of oil;

Figure 6 is a view similar to Figure 3, but illustrating a slight modification;

Figure 7 is a view similar to Figure 2, but illustrating another modification;

Figure 8 is a view similar to Figure 2, but illustrating a further modified embodiment of the present invention;

Figure 9 is a top plan view of the structure illustrated in Figure 8;

Figure 10 is a view in side elevation of the structure illustrated in Figure 9;

Figure 11 is a bottom plan view of the structure illustrated in Figure 9; and

Figure 12 is a fragmentary view of a slight modification taken in the direction of the arrows 12—12 of Figure 9.

The numeral 10 indicates a cylinder wall. Mounted for reciprocation within said cylinder wall is the piston 11, which piston may be provided with a plurality of circumferential grooves for the reception of piston rings.

For the purpose of convenience in the description of the present invention, the axis of reciprocation of the piston 11 will be considered to be vertical though it will be understood, of course, that this axis may be at any angle in relation to the vertical. A groove adapted to receive a piston ring is indicated by the numeral 12. Said groove 12 has the outwardly facing circumferential wall 13 (which will be referred to as the groove bottom wall) bounded by the groove upper wall 14 and the groove lower wall 15. The walls 14 and 15, each being in one plane, will be referred to herein as diametrical walls. Within said groove 12 is located the piston ring 16 which, according to usual practice, is split in its perimeter and is provided with the lap joint 17. In practice, there is commonly a certain amount of play of the piston ring 16 in the groove 12 in a direction axially of the piston. In a motor in which the cylinder wall is true and cylindrical there will be no appreciable movement of the piston ring in a radial direction. However, as the cylinder wall wears in service, it becomes conical in shape, being larger toward the combustion chamber, that is, toward the top as the parts are viewed in Figure 1. Accordingly, in a worn motor there is a reciprocating action of the piston ring 16 in a radial direction, it being noted that the piston ring, being split, is biased outwardly by its own resiliency. Moreover, the piston ring, according to common practice, will be urged outwardly in a radial direction by an expander spring.

Located between the wall 13 of the groove 12 and the piston ring 16 is the combined expander and oil check 18 which embodies the principles of the present invention and which, for purposes of convenience, will be referred to as an oil check. Said oil check, as illustrated in Figure 3, is in the form of a ring split in its perimeter. Said oil check embodies a peripheral approximately cylindrical wall biased radially outwardly against the inner surface of the corresponding piston ring 16.

Figure 2 represents the oil check 18 under conditions of service in which the upper and lower edges, designated 19 and 20, respectively, are located in engagement with the groove upper wall 14 and the groove lower wall 15, respectively, of the groove 12. As the parts are illustrated in Figure 2, the piston ring 16 is located in engagement with the lower wall 15 of the groove 12. The amount of play between the piston ring 16 in the groove 12 is shown exaggerated in Figure 2.

The oil check 18, in its biased or normal condition, should have an axial overall dimension such that said oil check 18 may be readily inserted into said groove. However, when the piston ring 16 is located in position in the groove 12 radially outwardly of the oil check 18, said oil check 18 will be distorted to reduce the radial dimension of the peripheral wall thereof which action will result in the lengthening of portions of said wall axially to cause the edges 19 and 20 to engage firmly against the walls 14 and 15, respectively, of the groove 12. As noted hereinafter, the lower edge 20 preferably lies in a wavy line.

The function of the oil check 18, as illustrated in Figures 1 to 6, in expanding axially when its peripheral wall is reduced radially will result from the features which will now be described.

Referring to Figures 2, 3, 4, and 5, the oil check 18 includes an approximately cylindrical portion 21. The lower portion of the oil check 18 is provided with a plurality of circumferentially spaced scallops 22—22 connected by intervening circumferential portions 23—23 which scallops 22—22 are swedged inwardly toward the axis of the oil check 18. In other words, the scallops 22—22 are offset from the approximately cylindrical portion 21, being shown (in Figures 2, 3, 4 and 5) as inclined to said cylindrical portion 21, that is, inclined with respect to the axis of said cylindrical portion 21 or the axis of the piston 11, and the lower extremities of the scallops 22—22 are adapted to contact against the wall 13 of the corresponding groove. It will be noted that intermediate of the openings 24—24 are the approximately cylindrical portions 25—25. It will be noted that in the structure illustrated in Figure 4 the approximately cylindrical portion 21, the portions 25—25, and the portions 23—23 provide segments of a circle disposed intermediate of the openings 24—24. The radius of each scallop 22 at the bottom thereof is approximately equal to the radius of the cylindrical portion 21. Ordinarily the entire oil check 18 will be made of resilient material. In any case, the portion thereof below the openings 24—24 should be resilient.

The width of the oil check axially thereof should be at least as great and preferably a little greater at the regions symmetrical with respect to the scallops 22 than at the portions 25. In other words, the axial dimension y—y in Figure 4 should preferably be as great as or greater than the axial dimension x—x.

Since the scallops 22—22 are inclined from the cylindrical portion 21 and since the overall height of the oil check at the regions of said scallops is the maximum height of said oil check, the result is that when said scallops are moved toward alignment with the cylindrical portion 21 there will be an increase in the vertical overall dimension or height of the oil check; that is, as the scallops 22—22 are moved toward parallelism with the axis of the piston, the vertical dimension of the oil check at the regions symmetrical with said scallops is increased over the vertical dimension at the regions 23—25. Since the tendency is for the oil to pass up past the oil rings to the explosion side of the piston to the explosion chamber, the top edge 21 of the ring 18 should be in a single plane so that said edge 21 may fit closely against the groove wall 14.

Expressed in still different words, the peripheral wall of the oil check 18, by reason of inwardly inclined scallops 22—22 and by reason of the openings 24—24, is collapsible in a radial direction, the height between the edges 19 and 20 will be increased depending upon the amount of this variation in radial dimension. No great exactness in the dimensions of the oil check 18 is necessary. The tight engagement between the top edge 21 of the oil check will minimize not only the seepage of oil but will minimize loss of compression as well.

The two ends of the oil check 18 are indicated by the numerals 26 and 27. When the oil check is in its normal or biased position, there will be a gap between these ends 26 and 27. When the piston 11, with the oil check 18 and the piston ring 16 in place therein is mounted within the cylinder wall 10, the ends 26 and 27 will approach each other more closely and in order to insure that said ends under these conditions will engage the inner wall of the piston ring 16, said ends will preferably be turned outwardly from the cylindrical surface of the portion 21 of the oil check. These outturned positions of the ends 26 and 27 are shown exaggerated in the drawings. Said ends 26 and 27 will preferably be located between adjacent scallops 22—22.

In the embodiment of the invention illustrated in Figure 4, openings 24—24 of a considerable dimension in a vertical direction have been illustrated. In the embodiment of the invention illustrated in Figure 5, the vertical dimensions of these openings have been very considerably reduced. According to the structure illustrated in Figure 5, slits 29—29 perform the functions of the openings 24—24 of Figure 4. Said slits provide sufficient openings for the passage of oil for many types of installation.

Preferably the slots 24—24 (Figures 2 and 4) and the slits 29 (Figure 5) will be symmetrically disposed along a circumferential line spaced from the upper edge 19, a distance about one-third of the height of the oil check 18.

In the modification illustrated in Figure 6, the scallops 22—22 are interrupted intermediate of their lengths to provide cantilever spring portions 30—30 which perform functions analogous to those of the uninterrupted scallops 22—22 in engaging the wall 13 of the groove 12 to cause the lengthening of the oil check axially to force the upper and lower edges 19 and 20 into engagement with the upper wall 14 and the lower wall 15 of the groove 12.

According to the modification illustrated in Figure 7, the portions or scallops of the oil check below the openings 24—24 may be approximately cylindrical in contours, one of these approximately cylindrical portions or scallops being indicated by the numeral 31. Said scallops 31, near the lower edge thereof, may be provided with the outstruck bosses 32 adapted to engage the cylindrical wall 13 of the groove 12.

In the embodiment illustrated in Figure 7, the scallops 31, being approximately cylindrical (as contrasted with conical), will buckle slightly when the oil check is subjected to pressure in the space between the groove walls 13, 14 and 15 and the inner surface of the piston ring 16. The oil check should have an overall axial dimension such that when in the piston ring groove, it will contact the upper and lower walls of the groove under a slight tension.

Figures 8, 9, 10, 11 and 12 illustrate other embodiments of the present invention. According to the disclosure of these figures, the scallops 33 are adapted to contact the groove wall 13 throughout their width. According to the disclosure in Figures 8, 9, 10, 11 and 12, the scallops 33 are of wavy cross section being provided with crests 33a—33a. Between the crests 33a—33a in each scallop is the trough 33b. The area of contact between the scallops 33 and the groove wall 13 is limited to the lines defining the summits of the crests 33a—33a. When reaction occurs between the groove wall 13 and the crests 33a—33a distortion occurs in the scallops 33 between said crests and there is a minimum of tendency to distort the cylindrical portion 21 of the ring lying between the regions 25—25.

According to the disclosure in Figure 12, each scallop 33 is cut away on the side thereof adjacent to the slot 24 as indicated by the numeral 34. This construction has the advantage that the scallops are weakened to a certain extent, resulting in less tendency to distort the cylindrical portion 21. Moreover, this cut-away portion permits the oil to flow more freely.

In the embodiments of the invention illustrated in Figures 8–12, radial compression of the wall of the oil check has less tendency to increase the axial overall dimension thereof than does such radial compression in the embodiment illustrated in Figures 1 to 5. Accordingly the oil checks illustrated in Figures 8–12 (as well as that illustrated in Figure 7) should have an overall axial dimension such that when located in the piston ring groove, it will contact the upper and lower walls of the groove with a slight tension.

In mounting any of the oil checks illustrated in Figures 7 to 12, in its groove, care should be taken to avoid distortion or buckling of the cylindrical portion 21. To this end, in mounting the oil check into a piston ring groove, compressive force should be applied in an axial direction against the bottom edge 20 of each scallop and against the top edge 19 at points adjacent to the portions 25. This procedure may be followed progressively around the oil check and any distortion which occurs will be in the scallops and will not throw the upper edge 19 out of a plane surface.

The mode of operation of the various illustrations of the present invention is substantially as follows:

The oil check 18 illustrated in Figures 1–6 will preferably have a biased over-all dimension between this lower edge 20 and this upper edge 19 of a value such that the oil check will fit easily but rather closely between the upper wall 14 and the lower wall 15 of the groove 12. When the piston ring 16 has been inserted and the piston 11 is mounted within the cylinder wall 10, the wall of the oil check 18 will be decreased in a radial direction whereby the dimension between the edge 20 at the regions of the scallops 22—22 and the scallops 22—22 and the edge 19 will be lengthened, resulting in the firm engagement of said edges with the bottom wall 15 and the top wall 14, respectively, of the groove 12 and the close engagement of the cylindrical portion 21 with the adjacent surface of the piston ring 16. The cylindrical portion 21 will, regardless of any play of the piston ring 16 in an axial direction, act effectively to prevent the passage of oil past the piston ring at the top of said ring and will minimize loss of compression. Any oil collecting between the oil check 18 and the wall 13 of the groove 12 will be permitted to pass through the openings 24—24 (Figures 2 and 4) or the openings 29—29 (Figure 5).

The embodiment illustrated in Figure 6 will, in general, operate similarly to that illustrated in Figures 1 to 5.

The embodiment illustrated in Figure 7 will also operate similarly to that illustrated in Figures 1 to 5 except that the scallops 31—31, being normally approximately cylindrical, will buckle slightly out of cylindrical form when inserted into the piston ring groove.

In the embodiment illustrated in Figures 8, 9, 10, 11 and 12, the scallops 33 will also buckle slightly radially but will preserve their parallel relationship with the axis of the piston 11.

Though certain and preferred embodiments of the present invention have been described in detail, many modifications will occur to those skilled in the art. It is intended to cover all such modifications that fall within the scope of the appended claims.

What is claimed is:

1. In combination, a cylinder wall, a piston therein, said piston having an annular groove provided with a circumferential wall and two diametrical walls, a piston ring in said groove, an annular oil check located in the annular space between the circumferential wall of said groove and said piston ring, said oil check being resilient and having an approximately cylindrical edge portion adapted to engage said piston ring and a diametrical wall of said groove, the opposite edge portion of said annular oil check including circumferentially spaced parts offset radially, said offset parts being of bowed conformation and being connected at their ends to the material of said oil check, said opposite edge portion of said oil check being positioned to engage the other diametrical wall of said groove.

2. In combination, a cylinder wall, a piston therein, said piston having an annular groove provided with a circumferential wall and two diametrical walls, a piston ring in said groove, an annular oil check located in the annular space between the circumferential wall of said groove and said piston ring, said oil check being resilient and having an approximately cylindrical edge portion adapted to engage said piston ring and a diametrical wall of said groove, the opposite edge portion of said annular oil check including circumferentially spaced parts offset radially, said offset parts being of bowed conformation and being connected at their ends to the material of said oil check, said opposite edge portion of said oil check being positioned to engage the other diametrical wall of said groove, said oil check being split in its perimeter, the ends of said oil check being outturned.

3. In combination, a piston having a circumferential piston ring groove, a split piston ring in said groove and an annular oil check located in said groove inside of said piston ring, said oil check comprising a member having an approximately cylindrical portion adapted to engage the top wall of said groove and the adjacent wall of said ring and circumferentially spaced inwardly extending offset resilient portions adapted to engage the circumferential wall and the bottom wall of said groove, said offset portions being of bowed conformation and being connected at their ends to the material of said oil check, whereby said oil check is expansible axially of said piston in response to radial compression of the wall of said oil check whereby the edge portions of said oil check will engage firmly against the top and bottom walls of said groove, while the cylindrical portion thereof engages said piston ring.

4. An oil check comprising a ring member, one edge portion thereof being approximately cylindrical, the opposite edge portion thereof being resilient and having circumferentially spaced parts thereof offset inwardly and adapted to engage the circumferential wall and a diametrical wall of a piston ring groove, said offset parts being of bowed conformation and being connected at their ends to the material of said oil check, whereby said oil check is expansible axially in response to radial compression of the wall of said oil check, said oil check at said inwardly offset parts having at least as great a height as the over-all axial height of said oil check whereby when said inwardly offset parts are moved toward alignment with said cylindrical portion the over-all height of said check is increased.

5. An oil check comprising a ring member, one edge portion thereof being approximately cylindrical, the opposite edge portion thereof being resilient and having circumferentially spaced parts thereof offset inwardly and adapted to engage the circumferential wall and a diametrical wall of a piston ring groove, said offset parts being of bowed conformation and being connected at their ends to the material of said oil check, whereby said oil check is expansible axially in response to radial compression of the wall of said oil check, said oil check at said inwardly offset parts having at least as great a height as the over-all axial height of said oil check whereby when said inwardly offset parts are moved toward alignment with said cylindrical portion the over-all height of said check is increased, the region between said offset parts and said cylindrical portion being defined by circumferentially disposed openings.

6. An oil check comprising a split ring member, one edge portion thereof being approximately cylindrical, the opposite edge portion being resilient and including spaced parts offset inwardly at regions located about said ring member, said offset parts being of bowed conformation and being connected at their ends to the material of said oil check, said member at the regions of said offset parts being provided with circumferentially disposed openings between said offset parts and said cylindrical portion and being at least equal in height to the axial overall height of said oil check.

7. An oil check comprising a split ring member, one edge portion thereof being approximately cylindrical, the opposite edge portion being resilient and including spaced parts offset inwardly at regions located about said ring member, said offset parts being of bowed conformation and being connected at their ends to the material of said oil check, said member at the regions of said offset parts being provided with circumferentially disposed openings between said offset parts and said cylindrical portion and being greater in height than at the regions intermediate of said offset parts.

8. An oil check comprising a split ring member, one edge portion thereof being approximately cylindrical, the opposite edge portion being resilient and including spaced parts offset inwardly at regions located about said ring, said offset parts being of bowed conformation and being connected at their ends to the material of said oil check, said member at the regions of said offset parts being open between said offset parts and said cylindrical portion and being at least equal in height to the axial overall height of said oil check, said offset portions normally occupying positions approximately parallel with the axis of said cylindrical portion.

9. An oil check comprising a split ring member, one edge portion thereof being approximately cylindrical, the opposite edge portion being resilient and including spaced parts offset inwardly at regions located about said ring, said offset parts being of bowed conformation and being connected at their ends to the material of said oil check, said member at the regions of said offset parts being open between said offset parts and said cylindrical portion and being at least equal in height to the axial overall height of said oil check, said offset portions having parts normally occupying positions approximately parallel with the axis of said cylindrical portion, each of said offset parts having a wavy contour circumferentially of said oil check having crests adapted to contact the circumferential wall of a piston ring groove.

10. An oil check comprising a split ring member, one edge portion thereof being approximately cylindrical, the opposite edge portion being resilient and including spaced parts offset inwardly at regions located about said ring, said offset parts being of bowed conformation and being connected at their ends to the material of said oil check, said member at the regions of said offset parts being open between said offset parts and said cylindrical portion and being at least equal in height to the axial overall height of said oil check, said offset portions normally occupying positions approximately parallel with the axis of said cylindrical portion, each of said offset parts having a wavy contour circumferentially of said oil check having crests adapted to contact the circumferential wall of a piston ring groove, said offset parts being recessed at their tops midway of their peripheral lengths.

11. An oil check comprising a ring member, one edge portion thereof being approximately cylindrical, the opposite edge portion thereof being resilient and having circumferentially spaced parts thereof offset inwardly and adapted to engage the circumferential wall and a diametrical wall of a piston ring groove, said offset parts being of bowed conformation and being connected at their ends to the material of said oil check, said oil check at said inwardly offset parts having at least as great a height as the overall axial height of said oil check, whereby when said inwardly offset parts are moved toward alignment with said cylindrical portion the overall height of said oil check is increased, each of said offset parts having a wavy contour circumferentially of said oil check having crests adapted to contact the circumferential wall of a piston ring groove.

12. An oil check comprising a ring member, one edge portion thereof being approximately cylindrical, the opposite edge portion thereof being resilient and having circumferentially spaced parts thereof offset inwardly and adapted to engage the circumferential wall and a diametrical wall of a piston ring groove, said offset parts being of bowed conformation and being connected at their ends to the material of said oil check, said oil check at said inwardly offset parts having at least as great a height as the overall axial height of said oil check, whereby when said inwardly offset parts are moved toward alignment with said cylindrical portion the overall height of said oil check is increased, the region between said offset parts and said cylindrical portion being defined by circumferentially disposed openings, each of said offset parts having a wavy contour circumferentially of said oil check having crests adapted to contact the circumferential wall of the piston ring groove.

13. An oil check comprising a split ring member, one edge portion thereof being approximately cylindrical, the opposite edge portion being resilient and including spaced parts offset inwardly at regions located about said ring, said offset parts being of bowed conformation and being connected at their ends to the material of said oil check, said member at the regions of said offset parts being open between said offset parts and said cylindrical portion and being at least equal in height to the axial overall height of said oil check, each of said offset parts having a wavy contour circumferentially of said oil check having crests adapted to contact the circumferential wall of a piston ring groove.

14. An oil check comprising a split ring member, one edge portion thereof being approximately cylindrical, the opposite edge portion being resilient and including spaced parts offset inwardly at regions located about said ring, said offset parts being of bowed conformation and being connected at their ends to the material of said oil check, said member at the regions of said offset parts being open between said offset parts and said cylindrical portion and being greater in height than at the regions intermediate of said offset parts, each of said offset parts having a wavy contour circumferentially of said oil check having crests adapted to contact the circumferential wall of a piston ring groove.

STANLEY S. SLYK.

REFERENCES CITED

The following references are of record in the file of this patent:

UNITED STATES PATENTS

| Number | Name | Date |
|---|---|---|
| 1,439,845 | Seib et al. | Dec. 26, 1922 |
| 1,516,327 | Brownfield | Nov. 18, 1924 |
| 1,592,887 | Howe | July 20, 1926 |
| 1,640,155 | Low | Aug. 23, 1927 |
| 1,694,311 | Clark | Dec. 4, 1928 |
| 1,766,498 | Frank | June 24, 1930 |
| 1,776,008 | Plater | Sept. 16, 1930 |
| 1,841,195 | Low | Jan. 12, 1932 |
| 2,101,244 | Curtis | Dec. 7, 1937 |
| 2,125,766 | Carlisle | Aug. 2, 1938 |